(12) United States Patent
Nygren et al.

(10) Patent No.: US 9,798,353 B2
(45) Date of Patent: *Oct. 24, 2017

(54) COMMAND PROTOCOL FOR ADJUSTMENT OF WRITE TIMING DELAY

(71) Applicant: Advanced Micro Devices, Inc., Sunnyvale, CA (US)

(72) Inventors: Aaron J. Nygren, San Francisco, CA (US); Ming-Ju E. Lee, San Jose, CA (US); Shadi M. Barakat, San Mateo, CA (US); Xiaoling Xu, Cupertino, CA (US); Toan D. Pham, San Jose, CA (US); W. Fritz Kruger, Sunnyvale, CA (US); Michael J. Litt, Toronto (CA)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 479 days.

This patent is subject to a terminal disclaimer.

(21) Appl. No.: 13/920,251

(22) Filed: Jun. 18, 2013

(65) Prior Publication Data

US 2013/0290767 A1 Oct. 31, 2013

Related U.S. Application Data

(63) Continuation of application No. 12/846,972, filed on Jul. 30, 2010, now Pat. No. 8,489,912.

(60) Provisional application No. 61/240,698, filed on Sep. 9, 2009.

(51) Int. Cl.
*G06F 1/12* (2006.01)
*G06F 1/14* (2006.01)
*G06F 1/08* (2006.01)
*G06F 13/16* (2006.01)

(52) U.S. Cl.
CPC .............. *G06F 1/14* (2013.01); *G06F 1/08* (2013.01); *G06F 13/1689* (2013.01)

(58) Field of Classification Search
CPC .......... G06F 1/14; G06F 1/08; G06F 13/1689; G06F 1/10
USPC ........................................................ 713/503
See application file for complete search history.

(56) References Cited

U.S. PATENT DOCUMENTS

| | | | | |
|---|---|---|---|---|
| 4,630,098 A * | 12/1986 | Fling | ...................... | H04N 7/012 348/449 |
| 5,689,692 A * | 11/1997 | MacTaggart | ............ | H04L 25/06 360/40 |
| 5,778,217 A * | 7/1998 | Kao | ...................... | H04L 7/0337 375/373 |
| 5,896,347 A * | 4/1999 | Tomita | ................. | G11C 7/1051 365/189.05 |

(Continued)

*Primary Examiner* — Paul R Myers
(74) *Attorney, Agent, or Firm* — Volpe and Koenig, P.C.

(57) ABSTRACT

Apparatuses are provided for adjusting the write timing. For instance, the apparatus can include an address/control bus, a write clock data recovery (WCDR) signal bus, and a timing adjustment module. The address/control bus can be configured to concurrently enable a WCDR mode of operation and an active mode of operation. The WCDR signal bus can be configured to transmit WCDR data to a memory device during the WCDR mode of operation. And the timing adjustment module can be configured to adjust a timing based on a phase shift in the WCDR data.

20 Claims, 9 Drawing Sheets

(56) References Cited

U.S. PATENT DOCUMENTS

| | | | | |
|---|---|---|---|---|
| 5,936,901 | A * | 8/1999 | Wong | G11C 29/12 365/189.07 |
| 5,966,388 | A * | 10/1999 | Wright | G11C 29/38 714/719 |
| 6,101,158 | A | 8/2000 | Hogan | |
| 6,807,613 | B1 | 10/2004 | Keeth et al. | |
| 7,000,170 | B2 | 2/2006 | Slutz et al. | |
| 7,016,259 | B2 * | 3/2006 | Jakobs | G11C 7/1078 327/146 |
| 7,075,375 | B2 | 7/2006 | Chen et al. | |
| 7,155,627 | B2 | 12/2006 | Matsui | |
| 7,187,598 | B1 | 3/2007 | Daugherty et al. | |
| 7,571,339 | B2 * | 8/2009 | Stimple | H03L 7/0807 713/500 |
| 7,668,679 | B2 * | 2/2010 | Best | G06F 13/1689 365/189.07 |
| 7,675,703 | B2 | 3/2010 | Albrecht et al. | |
| 7,948,812 | B2 | 5/2011 | Ware | |
| 8,046,541 | B1 * | 10/2011 | Dolev | G06F 13/1689 711/154 |
| 8,245,073 | B2 * | 8/2012 | Nygren | G11C 7/1045 711/167 |
| 8,489,912 | B2 * | 7/2013 | Nygren | G06F 1/08 713/503 |
| 2004/0062096 | A1 * | 4/2004 | Tanabe | G11C 29/1201 365/200 |
| 2004/0213067 | A1 * | 10/2004 | Best | G06F 1/10 365/222 |
| 2006/0090054 | A1 | 4/2006 | Choi et al. | |
| 2006/0156213 | A1 * | 7/2006 | Kikutake | G11C 29/24 714/800 |
| 2006/0218432 | A1 * | 9/2006 | Traskov | G06F 11/1016 714/5.11 |
| 2007/0217559 | A1 * | 9/2007 | Stott | G11C 7/1051 375/355 |
| 2008/0005518 | A1 * | 1/2008 | Gillingham | G06F 13/4243 711/167 |
| 2010/0188910 | A1 | 7/2010 | Kizer et al. | |
| 2010/0271092 | A1 | 10/2010 | Zerbe et al. | |
| 2010/0329045 | A1 | 12/2010 | Lee et al. | |
| 2011/0238870 | A1 * | 9/2011 | Ware | G01R 31/3171 710/35 |

* cited by examiner

| Operation | $\overline{CKE}$ | $\overline{CS}$ | $\overline{RAS}$ | $\overline{CAS}$ | $\overline{WE}$ | A[8:0] |
|---|---|---|---|---|---|---|
| Read | L | L | H | L | H | X |
| Write | L | L | H | L | L | X |
| Idle | L | L | H | H | L | X |
| Refresh | L | L | L | L | H | X |

| Operation | $\overline{CKE}$ | $\overline{CS}$ | $\overline{RAS}$ | $\overline{CAS}$ | $\overline{WE}$ | A[8] | A[7:0] |
|---|---|---|---|---|---|---|---|
| Read | L | L | H | L | H | L | X |
| Write | L | L | H | L | L | L | X |
| Idle | L | L | H | H | L | L | X |
| Refresh | L | L | L | L | H | L | X |

COMMAND PROTOCOL FOR ADJUSTMENT OF WRITE TIMING DELAY

CROSS REFERENCE TO RELATED APPLICATION

This application is a continuation of U.S. patent application Ser. No. 12/846,972, filed Jul. 30, 2010, titled "Command Protocol for Adjustment of Write Timing Delay", now allowed, which claims the benefit of U.S. Provisional Application No. 61/240,698, filed Sep. 9, 2009, titled "Command Protocol for Adjustment of Write Timing Delay," both of which are incorporated herein by reference in their entireties.

BACKGROUND

Field

Embodiments of the present invention generally relate to an adjustment of write timing in a memory device. More specifically, embodiments of the present invention refer to adjusting the write timing of the memory device based on a command protocol.

Background

Data communication between a processing unit and a memory device typically involves sending data along signal paths such as, for example, wires and traces. In a memory device with a synchronous interface, the processing unit may transmit a clock signal along with the data signal to the memory device. The clock signal is used to determine when the data signal should be latched by the memory device, thus synchronizing the memory device to the processing unit. For proper data recovery, the memory device must receive the clock signal within a time period that allows the clock signal to sample the data signal (e.g., the clock signal must sample the data signal within a period of time corresponding to a data eye of the data signal). Otherwise, the memory device may not recover the correct data value.

Real-world variations, such as temperature and jitter, can cause attenuation in the transmitted data signal and clock signal from the processing unit to the memory device, thus causing a loss in data signal integrity. This can result in poor or inaccurate data recovery by the memory device. As operating frequencies in computer systems increase, a need arises to transmit data more rapidly from the processing unit to the memory device. Accordingly, the memory device not only needs to sample data at a faster rate, but also needs to sample the data at the proper time.

SUMMARY OF EMBODIMENTS

Embodiments of the present invention include an apparatus for adjusting write timing. The apparatus can include an address/control bus, a write clock data recovery (WCDR) signal bus, and a timing adjustment module. The address/control bus can be configured to concurrently enable a WCDR mode of operation and an active mode of operation. The WCDR signal bus can be configured to transmit WCDR data to a memory device during the WCDR mode of operation. And the timing adjustment module can be configured to adjust a timing based on a phase shift in the WCDR data.

Embodiments of the present invention include a memory device. The memory device can include an address/control bus, a write clock data recovery (WCDR) signal bus, and a phase correlation module. The address/control bus can be configured to concurrently enable a WCDR mode of operation and an active mode of operation. The WCDR signal bus can be configured to receive WCDR data during the WCDR mode of operation. And the phase correlation module can be configured to determine a phase shift based on the data signal and the WCDR data.

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

FIG. 2 is an illustration of an exemplary table of modes of operation of a memory device.

FIG. 7 is an illustration of an embodiment of a table of modes of operation of a memory device that includes a write clock data recovery mode of operation that can be executed in parallel with other modes of operation of the memory device.

DETAILED DESCRIPTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the relevant art that the present invention, as described below, can be implemented in many different embodiments of software, hardware, firmware, and/or the entities illustrated in the figures. Thus, the operational behavior of embodiments of the present invention will be described with the understanding that modifications and variations of the embodiments are possible, given the level of detail presented herein.

Figure 1:
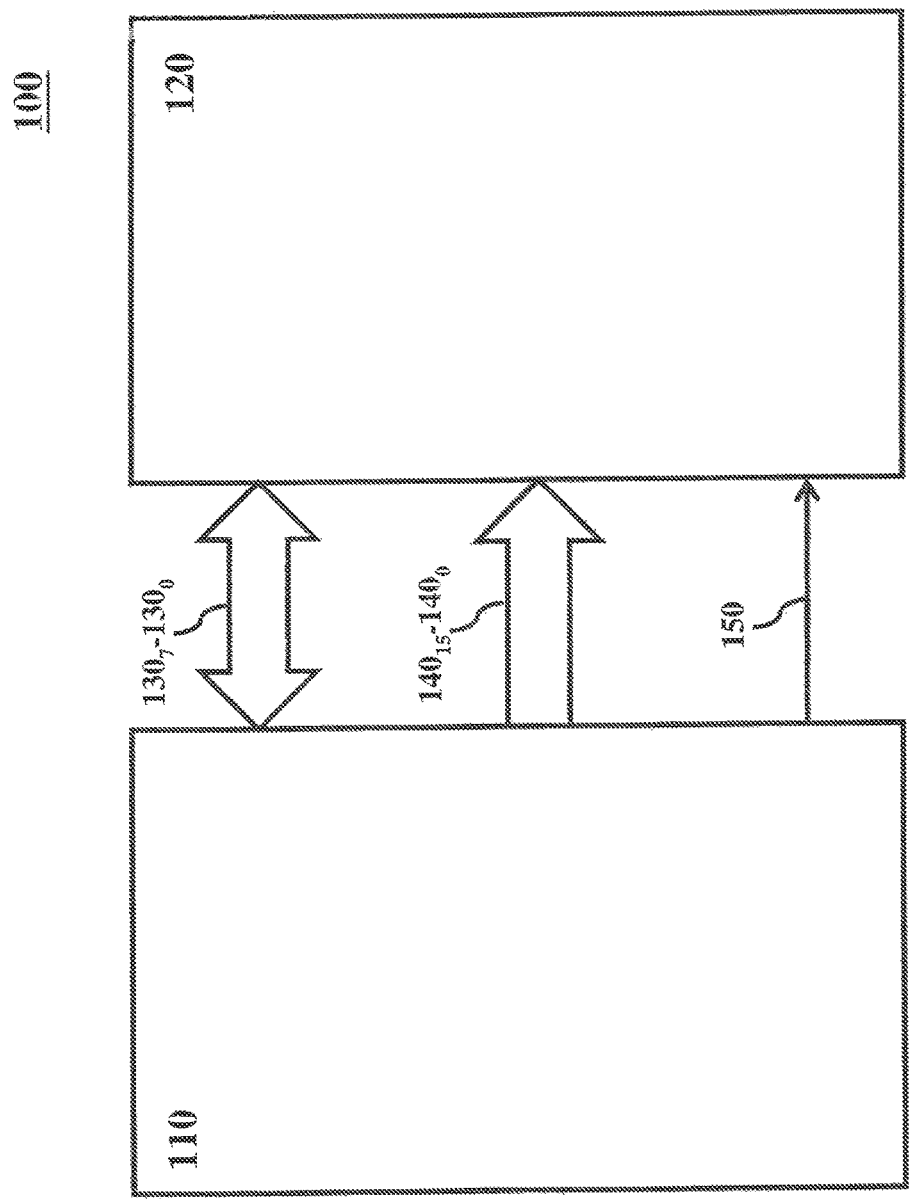
FIG. 1 is an illustration of an example computer system with a processing unit and a memory device.

FIG. 1 is an illustration of an example computer system 100 with a processing unit and a memory device. Computer system 100 includes a processing unit 110, a memory device 120, a data bus $130_7$-$130_0$, an address/control (A/C) bus $140_{15}$-$140_0$, and a clock signal 150 (e.g., a write clock signal).

Processing unit 110 transmits address/control signals, via A/C bus $140_{15}$-$140_0$, to memory device 120. Address/control signals can include, for example, clock enable (/CKE), chip select (/CS), row address strobe (/RAS), column address strobe (/CAS), write enable (/WE), and an address bus (e.g., A[8:0]). A command decoder (not shown) in memory device 120 receives the address/control signals and, based on bit settings of the address/control signals, indicates a mode of operation for memory device 120. Modes of operation for memory device 120 can include, for example, a read operation, a write operation, an idle operation, and a refresh operation.

FIG. 2 is an illustration of an exemplary table 200 of modes of operation of memory device 120 and their corresponding address/control signals. In table 200, the notation 'L' refers to an active-low signal, 'H' refers to an active-high signal, and 'X' represents a "don't care" signal (e.g., an address/control signal designated with an 'X' can have either an active-low or an active-high state). In a read mode of operation, clock enable, chip select, and column address strobe are set to 'L', while row address strobe and write enable are set to 'H'. In a write mode of operation, clock enable, chip select, column address strobe, and write enable are set to while row address strobe is set to 'H'. For both read and write modes of operation, the address bus (A[8:0]) are set to 'X'. The address/control bit settings for idle and refresh modes of operation for memory device 120 can be read from table 200 in a similar manner. A person of ordinary skill in the relevant art will recognize that table 200 is an example of address/control bit settings for various modes of operation of memory device 120 and that these modes and other modes of operation can be represented by different address/control bit settings.

In a synchronous memory system, the address/control signals on A/C bus $140_{15}$-$140_0$ of FIG. 1 are timed relative to an edge of clock signal 150 (e.g., a rising edge of clock signal 150), in which the address/control signals are sampled on the edge of clock signal 150. For example purposes, A/C bus $140_{15}$-$140_0$ is illustrated as a 16-bit data bus. Based on the description herein, a person skilled in the relevant art will recognize that the bus width of A/C bus $140_{15}$-$140_0$ can vary (e.g., 8-bits, 32-bits, etc.). Address/control buses and associated signals traveling on these buses are known to those persons skilled in the relevant art.

Processing unit 110 transmits and receives data, via data bus $130_7$-$130_0$, to and from memory device 120. During a write operation, data is transferred from processing unit 110 to memory device 120 via data bus $130_7$-$130_0$. During a read operation, data is transferred from memory device 120 to processing unit 110 via data bus $130_7$-$130_0$. In a synchronous memory system, the rate at which the data is transmitted and received by processing unit 110 is based on a clock signal such as, for example, clock signal 150. For exemplary purposes, data bus $130_7$-$130_0$ is illustrated as an 8-bit bi-directional data bus. Based on the description herein, a person skilled in the relevant art will recognize that the bus width of data bus $130_7$-$130_0$ can vary (e.g., 16-bits, 32-bits, etc.). Data buses and associated signals traveling on these buses are known to those persons skilled in the relevant art.

Memory device 120 stores data transmitted from processing unit 110. The receipt and storage of data (transmitted from processing unit 110) is known as "writing" to memory device 120. Conversely, data can be retrieved from memory device 120, which is known as "reading" from memory device 120. Memory device 120 can be configured with a synchronous interface, in which memory device 120 waits for clock signal 150 before processing the data on data bus $130_7$-$130_0$. For instance, memory device 120 can generate an internal clock signal, aligned with clock signal 150, to receive the data from data bus $130_7$-$130_0$ or to transmit the data from memory device 120 to processing unit 110 via data bus $130_7$-$130_0$. The internal clock signal of memory device 120 can be, for example, a multiple of the frequency of clock signal 150 (e.g., 2×, 4×, etc.) as understood by a person of ordinary skill in the relevant art.

Figure 3:
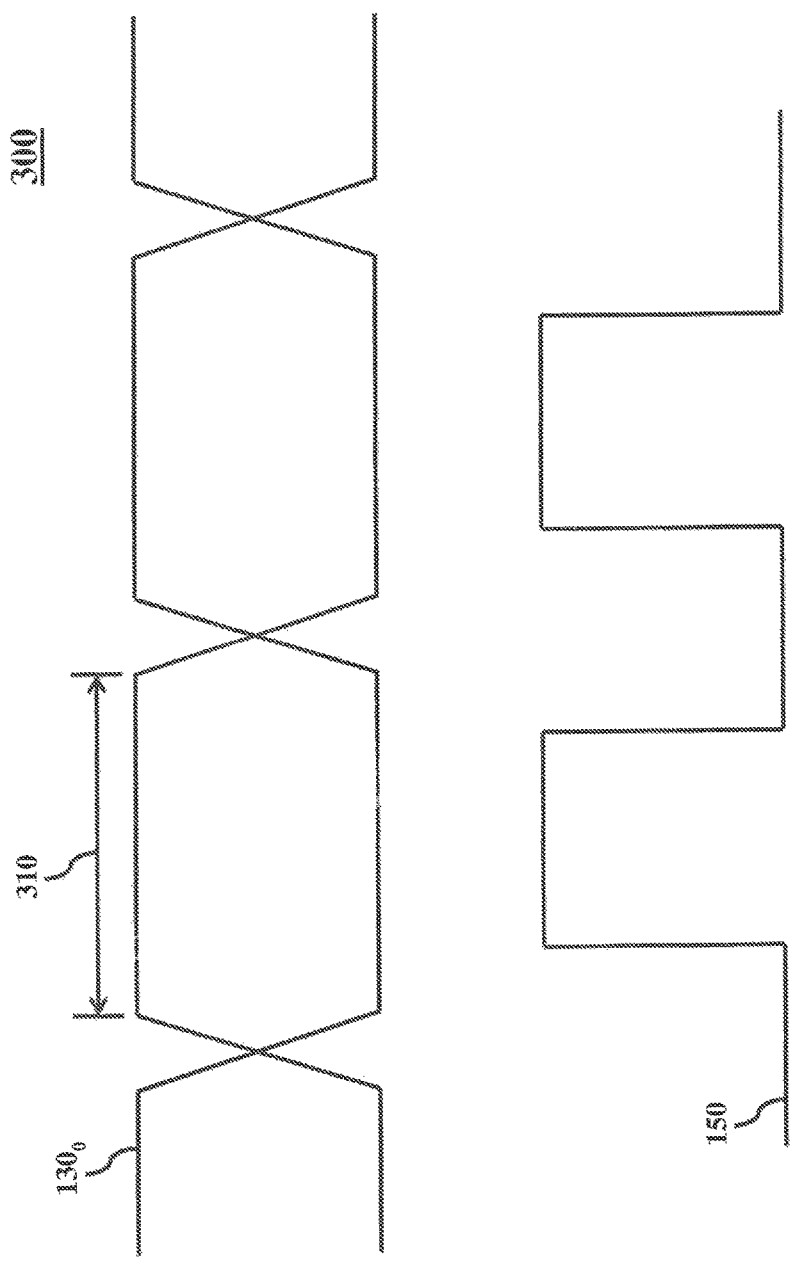
FIG. 3 is an illustration of an exemplary write timing diagram that is representative of proper data recovery by a memory device.

FIG. 3 is an illustration of an exemplary write timing diagram 300 for computer system 100 that is representative of proper data recovery by memory device 120. Write timing diagram 300 includes timings for a data eye for data signal $130_0$ and clock signal 150, where the data eye can define a period of time 310 in which clock signal 150 can be used to sample data signal $130_0$ (e.g., proper data recovery by memory device 120 can occur within period of time 310). A data eye refers to, for example, a portion of data signal $130_0$ with a valid binary value. Here, clock signal 150 is center aligned to data signal $130_0$ and samples data signal $130_0$ within the data eye when clock signal 150 is HIGH (or has a logic value of '1'). As understood by a person of ordinary skill in the relevant art, the center alignment of clock signal 150 to data signal $130_0$ provides an ideal write timing for computer system 100 since memory device 120 is allowed a sufficient period of time to receive and sample data signal $130_0$. A person of ordinary skill in the relevant art will understand that the alignment of clock signal 150 relative to data signal $130_0$ can occur in other alignment positions.

Figure 4:
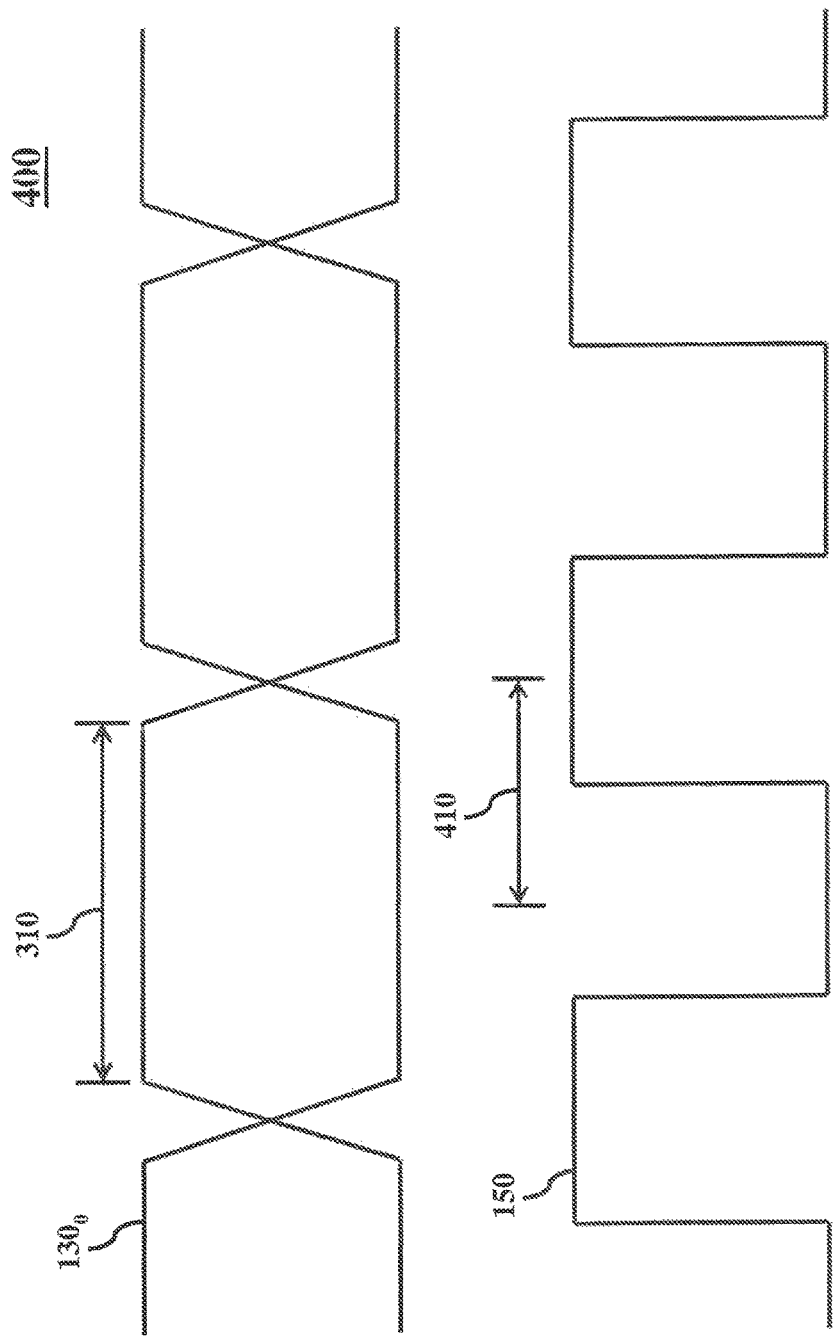
FIG. 4 is an illustration of an exemplary write timing diagram that is not representative of proper data recovery by a memory device.

FIG. 4 is an illustration of an exemplary write timing diagram 400 for computer system 100 that is not representative of proper data recovery by memory device 120. Similar to write timing diagram 300, write timing diagram 400 includes timings for the data eye of data signal $130_0$ and clock signal 150. However, clock signal 150 has a relative phase difference 410 (or timing skew) with respect to data signal $130_0$, where phase difference 410 may not provide memory device 120 a sufficient amount of time to sample data signal $130_0$ (e.g., a sufficient amount of time for memory device 120 to latch data signal $130_0$). Variations in relative phase difference 410 between data signal $130_0$ and clock signal 150 can be caused by various factors such as, for example, temperature and jitter in computer system 100. In exemplary write timing diagram 400, relative phase difference 410 can be defined by a difference between a center of data eye 310 and a center of clock signal 150 when clock signal 150 samples data signal $130_0$ (e.g., when clock signal 150 is HIGH or has a logic value of '1').

As the operating frequency of computer system 100 increases, memory device 120 not only needs to sample signals on data bus $130_7$-$130_0$ at a faster frequency, but also needs to sample the data signals at the proper time. Clock signal 150 should be optimally aligned with data bus $130_7$-$130_0$ to ensure proper sampling of the data. To align clock signal 150 with data signals on data bus $130_7$-$130_0$, an additional signal can be implemented in computer system 100 to adjust the relative phase difference (or timing skew) between data bus $130_7$-$130_0$ and clock signal 150 such that memory device 120 properly recovers data transmitted from processing unit 110. The method and system to adjust the relative phase difference between data bus $130_7$-$130_0$ and clock signal 150 is referred to herein as write clock data recovery (WCDR). Embodiments of the present invention introduce a WCDR mode of operation to computer system 100, where the WCDR mode of operation can be executed in conjunction with other modes of operation of memory device 120 (e.g., read, write, idle, and refresh modes of operation).

Figure 5:
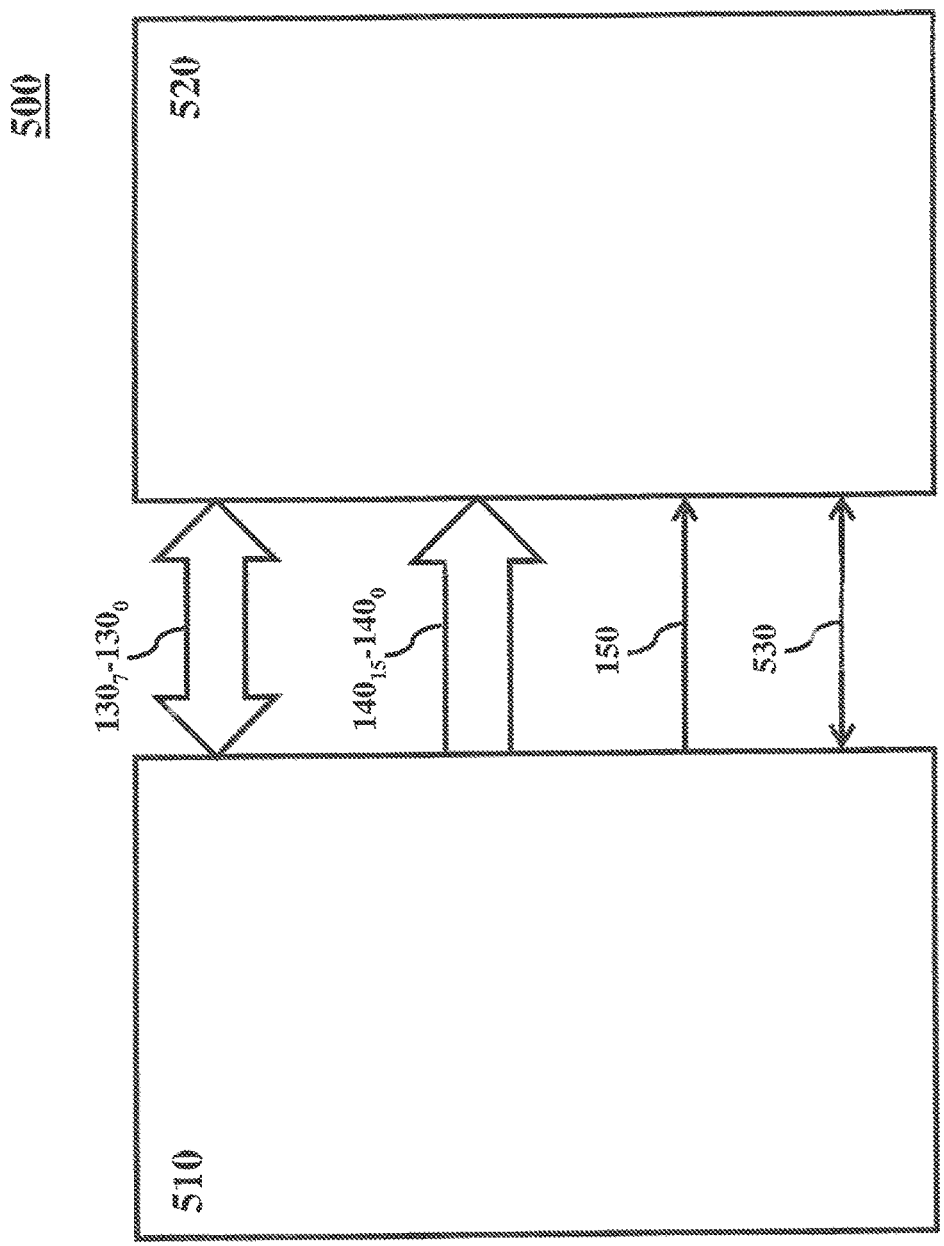
FIG. 5 is an illustration of an embodiment of a computer system to adjust write timing in a memory device.

FIG. 5 is an illustration of an embodiment of a computer system 500 to adjust write timing in a memory device. Computer system 500 includes a processing unit 510, a memory device 520, a WCDR signal 530 (also referred to herein as reference signal 530), data bus $130_7$-$130_0$, A/C bus $140_{15}$-$140_0$, and clock signal 150 (also referred to herein as write clock signal 150). Data bus $130_7$-$130_0$, A/C bus $140_{15}$-$140_0$, and write clock signal 150 function in a similar manner as that described above with respect to FIG. 1.

In an embodiment, processing unit 510 and memory device 520 are integrated circuit (IC) devices on a circuit board with WCDR signal 530, data bus $130_7$-$130_0$, A/C bus $140_{15}$-$140_0$, and write clock signal 150 communicatively coupling the two IC devices, where WCDR signal 530, data bus $130_7$-$130_0$, A/C bus $140_{15}$-$140_0$, and write clock signal 150 can be wires, interconnects, or circuit board traces. In another embodiment, processing unit 510 and memory device 520 are integrated on a single IC device with WCDR signal 530, data bus $130_7$-$130_0$, A/C bus $140_{15}$-$140_0$, and write clock signal 150 communicatively coupling processing unit 510 to memory device 520.

WCDR signal 530, data bus $130_7$-$130_0$, A/C bus $140_{15}$-$140_0$, and write clock signal 150 are connected to input/output (I/O) ports of processing unit 510 and memory device 520 that are used in the modes of operation of memory device 420 (e.g., read, write, idle, and refresh modes of operation). I/O ports that connect a processing unit to a memory device (e.g., DQ and clock pins) are known to persons skilled in the relevant art. In an embodiment, WCDR signal 530 can be connected to either a new or existing I/O port in processing unit 510 and to either a new or existing corresponding I/O port in memory device 520 to perform the functions described below. As described further below, WCDR signal 530 can be a unidirectional or a bidirectional signal according to an embodiment of the present invention.

In a further embodiment, WCDR signal 530 can be connected to an existing I/O port in processing unit 510 and to an existing corresponding I/O port in memory device 520, where the existing I/O ports in processing unit 510 and memory device 520 can be used for more than one function. In an embodiment, a voltage reference pin (e.g., VREFD pin) can be used during read and write modes of operation in computer system 500, where processing unit 510 provides an external voltage reference signal to memory device 520 for the operation of internal circuits of memory device 520. The voltage reference pin can also be used to transfer WCDR data between processing unit 510 and memory device 520 during a WCDR mode of operation, according to an embodiment of the present invention. During the WCDR mode of operation, in an embodiment, memory device 520 provides an internal voltage reference signal for the operation of its internal circuits that require the voltage reference signal, thus allowing the external voltage reference pin to be used during the WCDR mode of operation. The generation of internal and external voltage reference signals is known to those persons of ordinary skill in the relevant art.

Based on the description herein, a person of ordinary skill in the relevant art will recognize that other existing pins in computer system 500 can be used to implement WCDR signal 530. For instance, in an embodiment, another voltage reference pin (e.g., VPP pin) can be used in a similar manner described above with respect to the VREFD pin. The VPP pin can be used to carry timing information during a WCDR mode of operation. During a non-WCDR mode of operation, the VPP pin can be used to provide an external voltage reference signal to computer system 500.

In the alternative, WCDR signal 530 can be implemented on a new I/O port in processing unit 510 and memory device 520 of computer system 500 according to an embodiment of the present invention. The new I/O port can be a dedicated pin for WCDR signal 530.

Processing unit 510 is a OKI according to an embodiment of the present invention. Alternatively, in another embodiment, processing unit 510 can be a CPU or a memory controller. Based on the description herein, a person skilled in the relevant art will recognize that embodiments of the present invention can be implemented with other types of processing units, which are within the scope and spirit of the present invention.

In reference to FIG. 5, in an embodiment, memory device 520 is a dynamic random access memory (DRAM) device. Based on the description herein, a person skilled in the relevant art will recognize that embodiments of the present invention can be implemented with other types of memory devices. These other types of memory devices are within the scope and spirit of the present invention.

Figure 6:
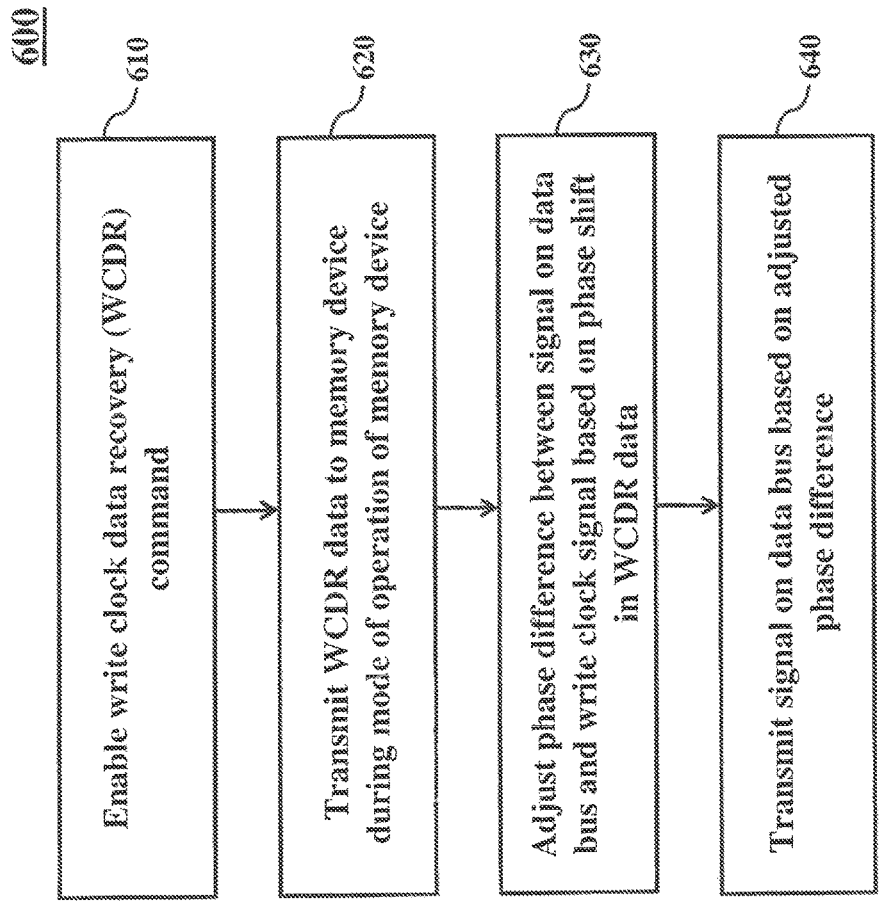
FIG. 6 is an illustration of an embodiment of a method for adjusting write timing in a memory device.

FIG. 6 is an illustration of an embodiment of a method 600 for adjusting write timing in a memory device. Method 600 can occur using, for example, computer system 500 of FIG. 5. For explanation purposes, computer system 500 will be used to facilitate in the description of method 600. However, based on the description herein, a person of ordinary skill in the relevant art will recognize that method 600 can be implemented in other computer systems.

The WCDR mode of operation, as described below with respect to method 600 of FIG. 6, can be executed in parallel with other modes of operation of memory device 520 according to an embodiment of the present invention. These modes of operation include, for example, a read, a write, an idle, and a refresh mode of operation. Among others, a benefit of the WCDR mode of operation is that this mode enables an efficient use of the other modes of operation of memory device 520. For instance, during an idle mode of operation where a memory bank of memory device 520 is not active, the WCDR mode operation can operate in parallel with the memory device's idle mode to facilitate a write timing adjustment in computer system 500. Similarly, during a mode of operation where a memory bank of memory device 520 is active e.g., a read and write mode of operation), the WCDR mode operation can operate in parallel with this active mode to facilitate the write timing adjustment in computer system 500. Accordingly, memory device 520 does not need to be taken "offline" to adjust its write timing.

In an embodiment, method 600 can be used by computer system 500 to adjust write timing between processing unit 510 and memory device 520 based on WCDR data. In particular, during a mode operation of memory device 520, WCDR signal 530 can be used by memory device 520 to synchronize a sampling between data signals on data bus $130_7$-$130_0$ and write clock signal 150. For instance, in an embodiment, data bus $130_7$-$130_0$ and write clock signal 150 are used to sample data at an interface of memory device 530 during a write mode of operation. During the write mode of operation, processing unit 510 can also transmit WCDR data on WCDR signal 530 to memory device 520 to detect a phase difference between data signals on data bus $130_7$-$130_0$ and write clock signal 150. The detection of the phase difference between data signals on data bus $130_7$-$130_0$ and write clock signal 150 is described further below.

In reference to method 600 of FIG. 6, in step 610, processing unit 510 enables a write clock data recovery (WCDR) mode of operation. In an embodiment, the WCDR mode of operation is activated in memory device 520 through a programmable mode register that contains programmable elements set in accordance with a user's requirements. As such, the user of computer system 500 can turn ON and OFF the WCDR mode of operation in memory device 520. Programmable mode registers and the programming thereof are known to persons of ordinary skill in the relevant art.

Processing unit 510 enables the WCDR mode of operation through address/control bit settings in A/C bus $140_{15}$-$140_0$, according to an embodiment of the present invention. In an embodiment, a control/address bit that is not designated to enable an existing mode of operation of memory device 520 (e.g., a read, a write, an idle, and a refresh mode of operation) can be used to enable the WCDR mode of operation. For instance, in reference to exemplary table 200, a "don't care" bit can be used to enable the WCDR mode of operation. A person of ordinary skill in the relevant art will recognize that, in using a "don't care" bit from an existing memory instruction set (e.g., table 200 of FIG. 2) to enable the WCDR mode of operation, the integration of the WCDR mode of operation into the existing memory instruction set would be less complex than redefining the entire memory instruction set to incorporate the WCDR mode of operation.

Based on the description herein, a memory instruction set that includes the WCDR mode of operation can be created in a format that is independent from an existing memory instruction set, according to an embodiment of the present invention. For ease of explanation, the WCDR mode of operation will be described with respect to an existing memory instruction set such as, for example, table 200 of FIG. 2.

FIG. 7 is an illustration of an embodiment of a table 700 of modes of operation of memory device 520 that includes a WCDR mode of operation that can be executed in parallel with other modes of operation of memory device 520. In an embodiment, the WCDR mode of operation can be set using an unused command code. For instance, in reference to table 700, an address bit (e.g., A[8]) is used to indicate the WCDR mode of operation in conjunction with other modes of operation of memory device 520. In read, write, idle, and refresh modes of operation, the WCDR mode of operation can be used in conjunction with each of these modes of operation by setting address bit A[8] to 'L'. Conversely, the WCDR mode of operation can be removed from operating in conjunction with the read, write, idle, and refresh modes of operation by setting address bit A[8] to 'H'. As can be appreciated by a person of ordinary skill in the relevant art, address bit A[8] is used to establish the WCDR mode of operation and is also used to carry address information for other modes of operations (e.g., read and write modes of operation). Based on the description herein, a person of ordinary skill in the relevant art will recognize that other address/control bits and polarities (e.g., 'L' and 'H') of the address/control bits can be used to enable the WCDR mode of operation and that the WCDR mode of operation can operate in conjunction with other modes of operation of memory device 520.

In reference to method 600, in step 620, processing unit 510 transmits WCDR data to memory device 520 during a mode of operation of the memory device. As noted in step 610, the WCDR mode of operation can operate in conjunction with other modes of operation of memory device 520, according to an embodiment of the present invention. To facilitate in the explanation of the WCDR mode of operation during another mode of operation of memory device 520, the WCDR mode of operation will be explained with a write mode of operation. For ease of explanation, data signal $130_0$ of data bus $130_7$-$130_0$ will be used in the explanation of the WCDR mode of operation. Based on the description herein, a person of ordinary skill in the relevant art will recognize that embodiments of the present invention are equally applicable to other modes of operation of memory device 520 and to data signals on data bus $130_7$-$130_1$.

Figure 8:
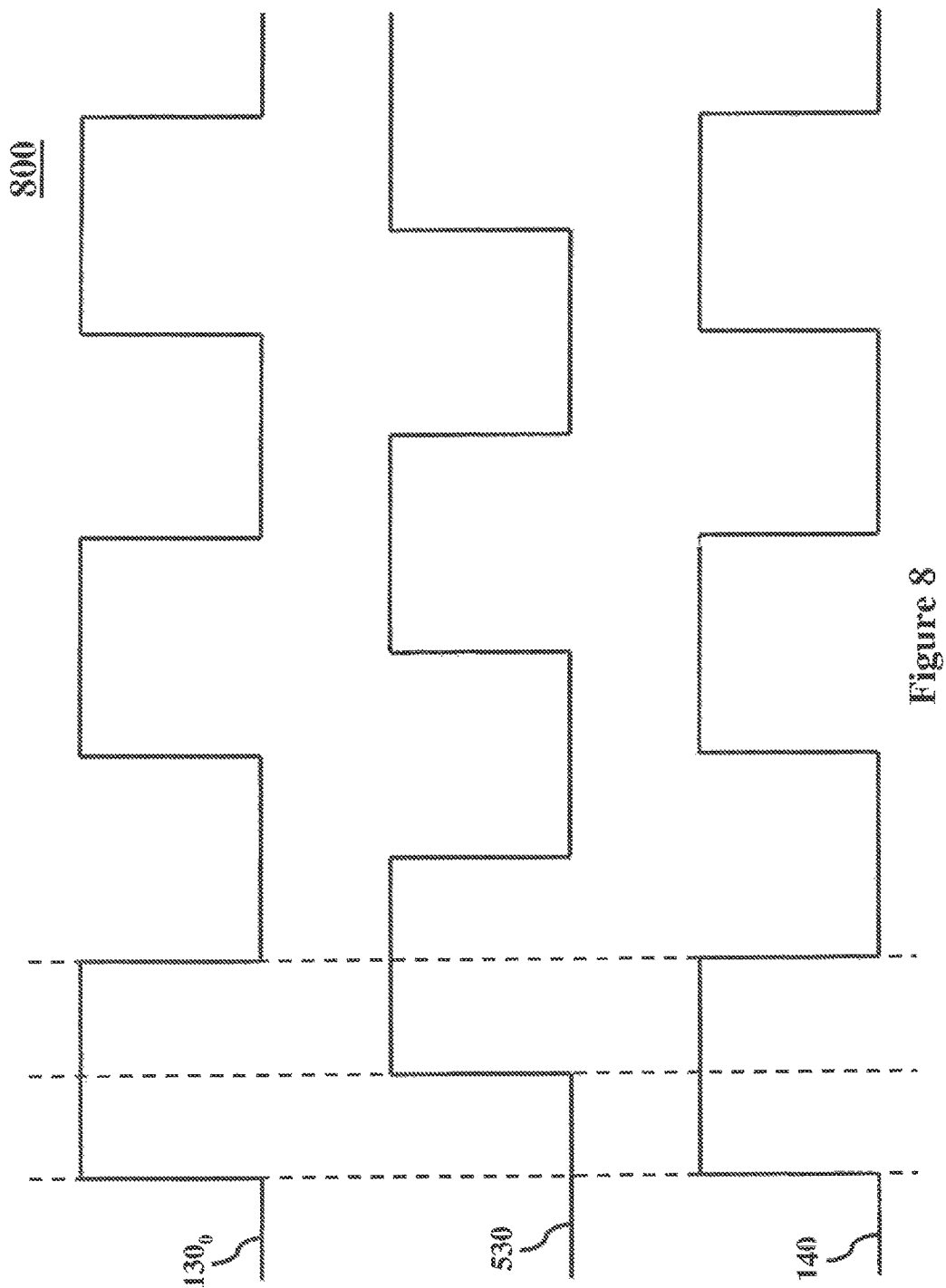
FIG. 8 is an illustration of an embodiment of a write timing diagram for a data signal, a write clock data recovery signal, and a write clock signal.

FIG. 8 is an illustration of an embodiment of a write timing diagram for data signal $130_0$, WCDR signal 530, and write clock signal 150. In an embodiment, during a write mode of operation, a data pattern is transmitted to memory device 520 via WCDR signal 530. WCDR signal 530 is edge aligned to data signal $130_0$ and is a unidirectional signal traveling from processing unit 510 to device memory 520. Further, in an embodiment, the data pattern of WCDR signal 530 has substantially the same data pattern as data signal $130_0$, such that WCDR signal 530 can be used to detect a phase shift in data signal $130_0$. In another embodiment, the data pattern WCDR signal 530 has a clock-like pattern, or a periodic pattern, to maximize a number of data samples that can be used (e.g., number of detectable edge transitions in WCDR signal 530) to detect a phase shift in computer system 500. An exemplary method and system to detect edge transitions in WCDR signal 530 can be found in U.S. patent application Ser. No. 12/490,454, filed Jun. 24, 2009, which is incorporated herein by reference in its entirety. Based on the description herein, a person of ordinary skill in the relevant art will recognize that the data pattern of WCDR signal 530 can vary based on the design of computer system 500.

With respect to data signal $130_0$, WCDR signal 530 is phase shifted from data signal $130_0$ by one-half unit interval (UI) according to an embodiment of the present invention, where UI refers to a minimum time interval between a transition in data signal $130_0$ (e.g., a 'H' to or a to 'H' transition). In an instance where WCDR signal 530 is not edge aligned to data signal $130_0$ (e.g., WCDR signal 530 is center aligned to data signal 130), data signal $130_0$ can shift up to one-half UI before WCDR signal 530 can be used to detect a phase shift in data signal $130_0$. Thus, in shifting reference signal one-half UI relative to data signal $130_0$, a phase shift in data signal $130_0$ can be detected with greater sensitivity (e.g., with minimal phase shift in WCDR signal 530). Further, in an embodiment, write clock signal 150 is center aligned to data signal $130_0$. With method 600 of FIG. 6, the relative phase shifts between data signal $130_0$ and write clock signal 150 can be determined based on a phase shift in WCDR signal 530 according to an embodiment of the present invention.

In reference to method 600 of FIG. 6, in step 630, processing unit 510 adjusts a phase difference between data signal $130_0$ and write clock signal 150 based on a phase shift in WCDR signal 530. In an embodiment, the phase of WCDR signal 530 can vary over time, in which phase variations in WCDR signal 530 can be monitored by computer system 500. The phase variations in WCDR signal 530 can be used by computer system 500 to adjust a phase difference between data signal $130_0$ and write clock signal 150, according to an embodiment of the present invention.

In an embodiment, WCDR signal 530 is transmitted to memory device 520, where memory device 520 computes a phase error signal. The phase error signal represents a phase shift in WCDR signal 530 over time, as detected by memory device 520. The phase error signal can be used to adjust a relative phase difference between data signal 130$_0$ and write clock signal 150 over time, according to an embodiment of the present invention. For instance, in reference to FIG. 4, the phase error signal can be used to introduce a phase delay in write clock signal 150 such that write clock signal 150 is center aligned with respect to data signal 130$_0$ (similar to write timing diagram 300 of FIG. 3). In the alternative, the phase error signal can be used to introduce a phase delay in data signal 130$_0$ such that data signal 130$_0$ is center aligned to write clock signal 150. In an embodiment, phase delay circuits in memory device 520 can be used to introduce phase delays in data signal 130$_0$ and write clock signal 150, respectively. An exemplary method and system to compute the phase error signal and to introduce phase delays in data signal 130$_0$ and write clock signal 150 in memory device 520 can be found in U.S. patent application Ser. No. 12/490,454, filed Jun. 24, 2009, which is incorporated herein by reference in its entirety.

In summary, with respect to FIG. 5, memory device 520 samples WCDR signal 530 and generates a phase error signal based on phase shifts in WCDR signal 530 over time. This phase error signal can be used by phase delay circuits in memory device 520 to delay either data signal 130$_0$ or write clock signal 150, or both data signal 130$_0$ and write clock signal 150, such that write clock signal 150 can be optimally aligned to data signal 130$_0$.

In another embodiment of the present invention, the phase error signal can be computed by processing unit 510 and applied to either data signal 130$_0$ or write clock signal 150, or both data signal 130$_0$ and write clock signal 150, prior to data signal 130$_0$ or write clock signal 150 being transmitted to memory device 520 for a write operation. In this embodiment, memory device 520 samples WCDR signal 530 and transmits a sampled version of the WCDR signal along the same path as WCDR signal 530 is received by memory device 520 (e.g., the same I/O port that is used to transmit WCDR signal 530 from processing unit 510 to memory device 520 is used to transmit the sampled version of the WCDR signal from memory device 520 to processing unit 510). In other words, in this embodiment, WCDR signal 530 is a bi-directional signal since it is used to carry WCDR data to and from memory device 520. Alternatively, in another embodiment, the sampled version of the WCDR signal can be transmitted from memory device 520 to processing unit 510 via different I/O ports from those I/O ports used to transmit WCDR signal 530 from processing unit 510 to memory device 520.

In an embodiment of the present invention, memory device 520 transmits the sampled WCDR data to processing unit 510 with preamble data bits appended to the sampled WCDR data. The preamble data bits can serve two purposes according to an embodiment of the present invention: (1) serve as an indication to processing unit 510 of when the sampled WCDR data will be arriving; and, (2) condition WCDR signal 530 to reduce inter-symbol interference along the signal line.

Upon receipt of the sampled version of the WCDR signal, processing unit 510 samples the received WCDR data and computes a phase error signal in a similar manner as described above, according to an embodiment of the present invention. In an embodiment, the phase error signal can be used to introduce a phase delay in either data signal 130$_0$ or write clock signal 150, or both data signal 130$_0$ and write clock signal 150. For instance, the phase error signal can be used to introduce a phase delay in write clock signal 150 such that write clock signal 150 is center aligned with respect to data signal 130$_0$ when write clock signal 150 and data signal 130$_0$ reach memory device 520. In the alternative, the phase error signal can be used to introduce a phase delay in data signal 130$_0$ such that data signal 130$_0$ is center aligned to write clock signal 150 at the time write clock signal 150 and data signal 130$_0$ reach memory device 520. In yet another alternative, the phase error signal can be used to introduce a phase delay in both data signal 130$_0$ and write clock signal 150 for timing alignment purposes as described above. An exemplary method and system to compute the phase error signal and to introduce phase delays in data signal 130$_0$ and write clock signal 150 in processing unit 510 can be found in U.S. patent application Ser. No. 12/490,454, filed Jun. 24, 2009, which is incorporated herein by reference in its entirety.

In summary, with respect to FIG. 5, processing unit 510 samples WCDR signal 530 after WCDR signal 530 has traversed the signal path to and from memory device 520. In an embodiment, the phase error signal computed by processing unit 510 takes into account the complete signal path of WCDR signal 530 when introducing the phase delay in either data signal 130$_0$ or write clock signal 150, or both data signal 130$_0$ and write clock signal 150. The phase error signal can be used by processing unit 510 to delay either data signal 130$_0$ or write clock signal 150, or both data signal 130$_0$ and write clock signal 150, such that write clock signal 150 can be optimally aligned to data signal 130$_0$ at memory device 520.

In yet another embodiment of the present invention, memory device 520 receives WCDR signal 530 and generates a phase error signal in a similar manner described above. In this embodiment, memory device 520 transmits the phase error signal to processing unit 510 such that processing unit 510 delays either data signal 130$_0$ or write clock signal 150, or both data signal 130$_0$ and write clock signal 150, such that write clock signal 150 can be optimally aligned to data signal 130$_0$ at memory device 520.

In reference to method 600 of FIG. 6, in step 640, processing unit 510 transmits data signal 130$_0$ based on the adjusted phase difference between data signal 130$_0$ and write clock signal 150 described above with respect to step 630. With the adjusted phase difference between data signal 130$_0$ and write clock signal 150, memory device 520 is able to properly capture data signals transmitted on data bus 130$_7$-130$_0$, in which a verification of proper data recovery can be performed by error detection and correction (EDC) techniques such as, for example, a checksum function applied to the data signals received by memory device 520.

In an embodiment, upon receipt of the data signals on data bus 130$_7$-130$_0$, memory device 520 can perform a checksum function on the data signals. The result of the checksum function can be transmitted to processing unit 510 on either an EDC signal line or WCDR signal 530 for a determination on whether memory device 520 properly recovered the data signals on data bus 130$_7$-130$_0$. Processing unit 510 can make this determination by comparing a checksum value of the data signals prior to transmission to memory device 520 to the checksum value received from memory device 520. The checksum function and other EDC techniques are known to those persons of ordinary skill in the relevant art.

Figure 9:
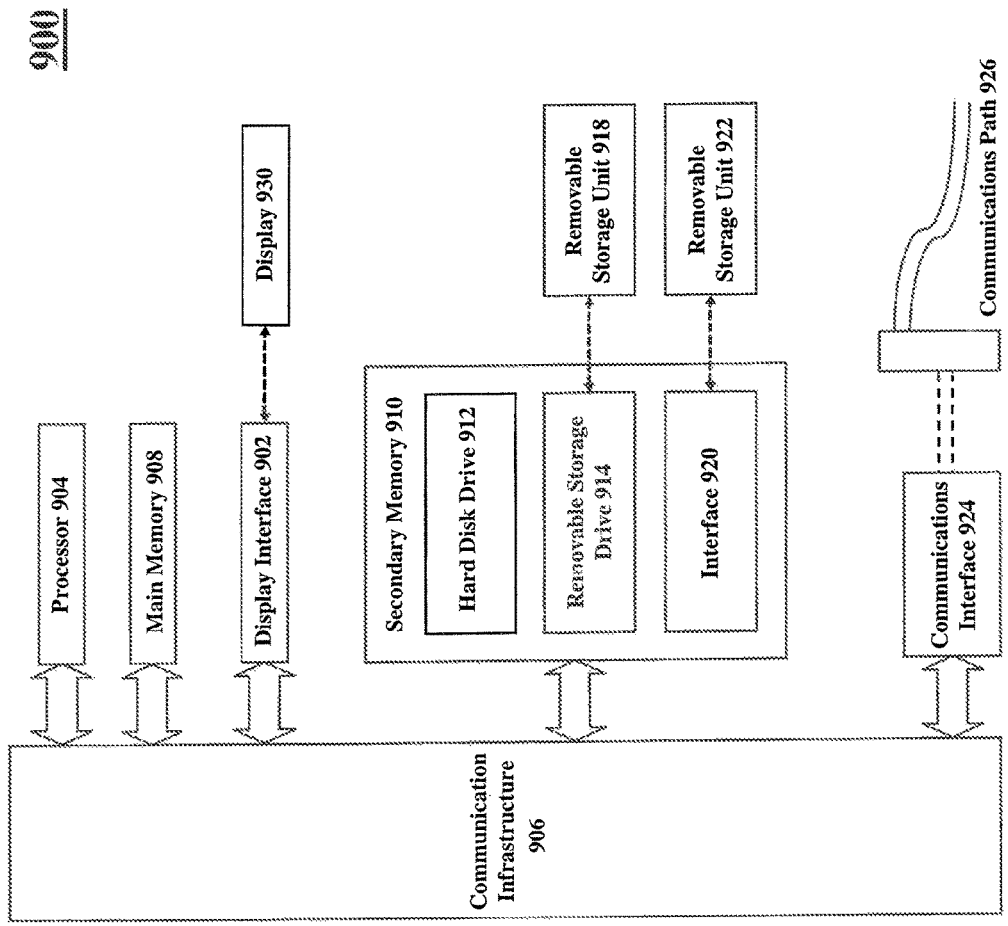
FIG. 9 is an illustration of an example computer system in which embodiments of the present invention can be implemented.

Various aspects of the present invention may be implemented in software, firmware, hardware, or a combination thereof. FIG. 9 is an illustration of an example computer system 900 in which embodiments of the present invention, or portions thereof, can be implemented as computer-readable code. For example, the method illustrated by flowchart 600 of FIG. 6 can be implemented in computer system 900. Various embodiments of the present invention are described in terms of this example computer system 900. After reading this description, it will become apparent to a person skilled in the relevant art how to implement embodiments of the present invention using other computer systems and/or computer architectures.

It should be noted that the simulation, synthesis and/or manufacture of various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core (such as a GPU core) that is embodied in program code and can be transformed to hardware as part of the production of integrated circuits.

Computer system 900 includes one or more processors, such as processor 904. Processor 904 may be a special purpose or a general purpose processor (e.g., a GPU). Processor 904 is connected to a communication infrastructure 906 (e.g., a bus or network).

Computer system 900 also includes a main memory 908, preferably random access memory (RAM), and may also include a secondary memory 910. Secondary memory 910 can include, for example, a hard disk drive 912, a removable storage drive 914, and/or a memory stick. Removable storage drive 914 can include a floppy disk drive, a magnetic tape drive, an optical disk drive, a flash memory, or the like. The removable storage drive 914 reads from and/or writes to a removable storage unit 918 in a well-known manner. Removable storage unit 918 can comprise a floppy disk, magnetic tape, optical disk, etc. which is read by and written to by removable storage drive 914. As will be appreciated by persons skilled in the relevant art, removable storage unit 918 includes a computer-usable storage medium having stored therein computer software and/or data.

In alternative implementations, secondary memory 910 can include other similar devices for allowing computer programs or other instructions to be loaded into computer system 900. Such devices can include, for example, a removable storage unit 922 and an interface 920. Examples of such devices can include a program cartridge and cartridge interface (such as those found in video game devices), a removable memory chip (e.g., EPROM or PROM) and associated socket, and other removable storage units 922 and interfaces 920 which allow software and data to be transferred from the removable storage unit 922 to computer system 900.

Computer system 900 can also include a communications interface 924. Communications interface 924 allows software and data to be transferred between computer system 900 and external devices. Communications interface 924 can include a modem, a network interface (such as an Ethernet card), a communications port, a PCMCIA slot and card, or the like. Software and data transferred via communications interface 924 are in the form of signals, which may be electronic, electromagnetic, optical, or other signals capable of being received by communications interface 924. These signals are provided to communications interface 924 via a communications path 926. Communications path 926 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 918, removable storage unit 922, and a hard disk installed in hard disk drive 912. Computer program medium and computer-usable medium can also refer to memories, such as main memory 908 and secondary memory 910, which can be memory semiconductors (e.g., DRAMs, etc.). These computer program products provide software to computer system 900.

Computer programs (also called computer control logic) are stored in main memory 908 and/or secondary memory 910. Computer programs may also be received via communications interface 924. Such computer programs, when executed, enable computer system 900 to implement embodiments of the present invention as discussed herein. In particular, the computer programs, when executed, enable processor 904 to implement processes of embodiments of the present invention, such as the steps in the methods illustrated by flowchart 600 of FIG. 6, discussed above. Accordingly, such computer programs represent controllers of the computer system 900. Where embodiments of the present invention are implemented using software, the software can be stored in a computer program product and loaded into computer system 900 using removable storage drive 914, interface 920, hard drive 912, or communications interface 924.

Embodiments of the present invention are also directed to computer program products including software stored on any computer-usable medium. Such software, when executed in one or more data processing device, causes a data processing device(s) to operate as described herein. Embodiments of the present invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by persons skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. An apparatus for adjusting write timing, the apparatus comprising:
an address/control bus port comprising circuitry configured to transmit a signal to concurrently enable a write clock data recovery (WCDR) mode of operation and an active mode of operation in a memory device;

a data bus port comprising circuitry configured to transmit a data signal to the memory device during the active mode of operation; and a WCDR signal bus port comprising circuitry configured to transmit WCDR data to the memory device during the WCDR mode of operation;

wherein the WCDR data includes information indicating a phase difference between the data signal and a clock signal;

the WCDR signal bus port further comprising circuitry configured to receive a phase error signal in response to the WCDR data.

2. The apparatus of claim 1, wherein an unused address/control bit from the address/control bus port is configured to enable the WCDR mode of operation.

3. The apparatus of claim 1, wherein the WCDR data comprises a data pattern substantially similar to the data signal.

4. The apparatus of claim 1, wherein the WCDR data comprises a data pattern with a periodic pattern.

5. The apparatus of claim 1, wherein the active mode of operation comprises at least one of a read, a write, and a refresh mode of operation.

6. The apparatus of claim 1, wherein the WCDR signal bus port is configured for an alternate function outside of the WCDR mode of operation.

7. The apparatus of claim 6, wherein the alternate function comprises providing an external voltage reference to the apparatus.

8. The apparatus of claim 1, wherein the WCDR signal bus port is configured to receive data associated with a phase shift from the memory device.

9. The apparatus of claim 1, wherein the WCDR signal bus port is configured to receive a sampled version of the WCDR data from the memory device; the apparatus further comprising a timing adjustment module configured to determine a phase shift based on the sampled version of the WCDR data and to adjust a timing based on the phase shift.

10. The apparatus of claim 9, wherein the sampled version of the WCDR data comprises preamble bits.

11. The apparatus of claim 1, further comprising a timing adjustment module configured to adjust a timing of the data signal, a clock signal, or a combination thereof.

12. The apparatus of claim 1, wherein WCDR signal bus port is a unidirectional or bidirectional bus port.

13. A memory device comprising:

an address/control bus port comprising circuitry configured to receive a signal to concurrently enable a write clock data recovery (WCDR) mode of operation and an active mode of operation in the memory device;

a data bus port comprising circuitry configured to receive a data signal during the active mode of operation;

a WCDR signal bus port comprising circuitry configured to receive WCDR data during the WCDR mode of operation; and a phase correlation module configured to determine a phase shift based on the WCDR data;

wherein the WCDR data includes information indicating a phase difference between the data signal and a clock signal;

the WCDR signal bus port further comprising circuitry configured to transmit a phase error signal based on the phase shift.

14. The memory device of claim 13, wherein the phase correlation module is configured to determine the phase shift based on the data signal and the WCDR data.

15. The memory device of claim 13, wherein the WCDR signal bus port is configured to transmit the phase shift.

16. The memory device of claim 13, wherein the address/control bus port comprises an unused address/control bit configured to enable the WCDR mode of operation.

17. The memory device of claim 13, further comprising a timing adjustment module configured to adjust a timing based on the phase shift.

18. The memory device of claim 17, wherein the timing adjustment module is configured to introduce a phase delay in a dock clock signal, the data signal, or a combination thereof.

19. The memory device of claim 13, wherein the memory device comprises a dynamic random access memory.

20. The memory device of claim 13, wherein the WCDR signal bus port is configured to transmit sampled data with preamble bits.

* * * * *